US008545691B2

(12) United States Patent
Teymour et al.

(10) Patent No.: US 8,545,691 B2
(45) Date of Patent: Oct. 1, 2013

(54) AQUEOUS MEDIUM MANAGEMENT VIA SUPER ABSORBENT MATERIALS

(75) Inventors: Fouad Teymour, Chicago, IL (US); Said Al-Hallaj, Chicago, IL (US)

(73) Assignee: Illinois Institute of Technology, Chicago, IL (US)

( * ) Notice: Subject to any disclaimer, the term of this patent is extended or adjusted under 35 U.S.C. 154(b) by 802 days.

(21) Appl. No.: 12/433,489

(22) Filed: Apr. 30, 2009

(65) Prior Publication Data
US 2010/0276300 A1 Nov. 4, 2010

(51) Int. Cl.
C02F 1/00 (2006.01)
C02F 1/46 (2006.01)
C02F 1/48 (2006.01)
C25C 1/02 (2006.01)

(52) U.S. Cl.
USPC ........ 205/628; 204/242; 210/747.2; 210/746; 210/748.01

(58) Field of Classification Search
USPC ...................................... 205/637; 210/747.2
See application file for complete search history.

(56) References Cited

U.S. PATENT DOCUMENTS

| | | | | |
|---|---|---|---|---|
| 3,133,137 A | * | 5/1964 | Loeb et al. | 264/41 |
| 5,354,264 A | * | 10/1994 | Bae et al. | 604/21 |
| 6,468,412 B2 | * | 10/2002 | Bryan et al. | 205/500 |
| 6,869,464 B2 | * | 3/2005 | Klemic | 95/117 |
| 2004/0007534 A1 | * | 1/2004 | Roach et al. | 210/691 |
| 2008/0073274 A1 | * | 3/2008 | Klemic | 210/673 |
| 2008/0244969 A1 | * | 10/2008 | Muthiah et al. | 47/48.5 |
| 2010/0009224 A1 | * | 1/2010 | Ku et al. | 429/21 |

OTHER PUBLICATIONS

IPRO 312: Active Porous Pavement System for Storm Water Control. Shoulder, S; Lewis, W; Johnson, S; Rybaltowski, K. Published May 2008.*
Tanaka, T.; Nishio, I.; Sun, S-T.; Ueno-Nishio, S. Collapse of Gels in an Electric Field. Science 218, 467-469, 1982.*
Dzinomwa, G.P.T.; Wood, C.J.; Hill, D.J.T. Fine Coal Dewatering Using pH and Temperature-sensitive Superabsorbent Polymers. Polymers for Advanced Technologies, 8, 767-772, 1997.*
Zdunek et al., "Water Recovery Using a Membrane/Super Absorbent Polymer System," AMTA/SEDA Joint Conference & Exposition, Naples, FL, Jul. 17, 2008, (28 pages).
IPRO 312, "Final Report," May 1, 2008, (6 pages).
Anderson et al., Proposal "Evaluation and Design of Hydrogel-Based Systems for the Dewatering of Biosolids," Nov. 2008, (25 pages).

* cited by examiner

*Primary Examiner* — Nicholas A Smith
*Assistant Examiner* — Brian W Cohen
(74) *Attorney, Agent, or Firm* — Pauley Petersen & Erickson

(57) ABSTRACT

A super absorbent polymer material is contacted with an aqueous medium to absorb at least a portion of the aqueous medium. At least portion of the aqueous medium absorbed super absorbent material is subsequently regenerated to release water therefrom and to form a regenerated super absorbent material suitable for the contacting with a second quantity of an aqueous medium. Also disclosed are layered composites including an electrically conductive metal support layer, a layer of super absorbent material disposed thereon, and a layer of a selective semi-permeable material disposed adjacent the layer of the super absorbent material and spaced apart from the electrically conductive metal support layer.

10 Claims, 4 Drawing Sheets

AQUEOUS MEDIUM MANAGEMENT VIA SUPER ABSORBENT MATERIALS

BACKGROUND OF THE INVENTION

This invention relates generally to super absorbent materials and, more particularly, to aqueous medium management, including methods and devices, that make use of such super absorbent materials.

Water is an increasingly valuable resource in many and varied applications. As a result, proper and more efficient management of water resources is a matter of ongoing pursuit.

Super absorbent polymers (SAP) are polymers that typically can absorb and retain extremely large amounts of liquid relative to its own mass. Super absorbent polymers that absorb water, sometimes referrred to as "hydrogels", can commonly absorb aqueous solutions through hydrogen bonding with the water molecule. Perhaps the most common or largest current use or application of super absorbent polymers can be found in personal disposable hygiene products, such as baby diapers and adult protective underwear, for example.

SUMMARY OF THE INVENTION

A general object of the invention is to provide to improved methods and devices that make use of such super absorbent materials.

In certain specific aspects, the invention provides such methods involving contacting a super absorbent polymer with a first quantity of an aqueous medium to absorb at least a portion of the first quantity of the aqueous medium by the super absorbent material. At least portion of the aqueous medium absorbed super absorbent material is subsequently regenerated to release water therefrom and to form a regenerated super absorbent material suitable for the contacting with a second quantity of an aqueous medium.

As discussed in greater detail below, particular such regeneration processing can be appropriately varied and may, for example, involve application to the aqueous medium absorbed super absorbent material of at least one factor selected from the group of temperature, pH, electric current and light effective to release water from the aqueous medium absorbed super absorbent material.

In one particular embodiment, the invention comprehends such a method wherein the aqueous medium contains at least one non-aqueous substance and the method additionally involves passing the aqueous medium through a selective semi-permeable material to separate at least a portion of the at least one non-aqueous substance from the aqueous medium prior to the contacting of the super absorbent polymer with the first quantity of the aqueous medium.

Examples of specific such processing include the desalination of water, hydrolysis of water and the recovery of hydrogen, storm water collection or management, waste water and biosolids treatment or management.

In another aspect, the invention provides a device useful in implementation of such processing.

In accordance with one embodiment, such a device includes a layered composite. The layer composite includes an electrically conductive metal support layer to regenerate the aqueous medium absorbed super absorbent material upon application of electric current thereto, a first layer of the aqueous medium absorbed super absorbent material disposed on the electrically conductive metal support layer, and a first layer of the selective semi-permeable material disposed adjacent the first layer of the aqueous medium absorbed super absorbent material and spaced apart from the electrically conductive metal support layer thereby.

There is also provided a layered composite that includes an electrically conductive metal support layer to regenerate an aqueous medium absorbed super absorbent material upon application of electric current thereto. The composite also includes a first layer of the aqueous medium absorbed super absorbent material disposed on the electrically conductive metal support layer and a first layer of a selective semi-permeable material disposed adjacent the first layer of the aqueous medium absorbed super absorbent material and spaced apart from the electrically conductive metal support layer thereby.

As used herein, references to materials as "super absorbent polymers", also referred to as SAP, are to be understood to generally refer to polymers that can absorb and retain extremely large amounts of a liquid relative to their own mass.

Further, references herein to "hydrogels" are to be understood to generally refer to super absorbent polymers that absorb water. In practice, such materials commonly have absorbency capacities in the general range of from about 10 grams of water per gram of hydrogel to about 1000 grams of water per gram of hydrogel, and most commonly in a range of from about 200 grams of water per gram of hydrogel to about 500 grams of water per gram of hydrogel.

Other objects and advantages will be apparent to those skilled in the art from the following detailed description taken in conjunction with the appended claims and drawings.

DESCRIPTION OF PREFERRED EMBODIMENTS

Figure 1:
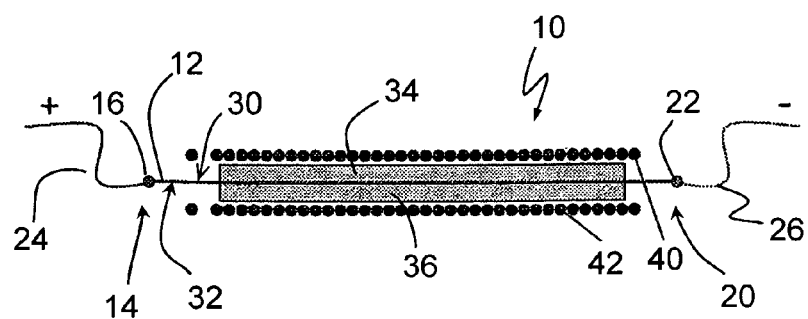
FIG. 1 is a simplified schematic diagram of a SAP-including layered composite in accordance with another aspect of the invention.

FIG. 1 illustrates a layered composite, generally designated by the reference numeral 10, in accordance with one aspect of the invention. As described in greater detail below, the layered composite 10 includes a super absorbent polymer material such as in the nature of a hydrogel and can desirably be used to separate at least a portion of a selected non-aqueous substance from an aqueous medium. In accordance with specific embodiments, the invention can be applied to separate various selected non-aqueous substances such as including one or more of biosolids, salts, impurities and other solutes, for example, from an aqueous medium. The layered composite 10 can find particular application for the dewatering of colloidal, slurry, particulate suspensions and the like. In such applications, the super absorbent polymer material swells as it absorbs water from these media.

The layer composite 10 includes a support layer 12 such as formed of an electrically conductive material such as in the form of a wire mesh. The support layer has a first end 14 whereat a first electrode 16 is disposed and an opposed second end 20 whereat a second electrode 22 is disposed. A first electric conducting wire 24 connects the first electrode 16 to the positive side of an electric power source (not shown). A second electric conducting wire 26 connects the second electrode 22 to the negative side of the electric power source. Suitable electric conducting wires such as composed of solid metal and such as known in the art can be used.

The support layer 12 has opposed first and second surfaces, 30 and 32, respectively. A first layer 34 of super absorbent material is disposed on the support layer first surface 30. A second layer 36 of super absorbent material is disposed on the support layer second surface 32.

Those skilled in the art and guided by the teaching herein provided will appreciate that the term "super absorbent materials" generally refers to super absorbent polymers (SAP) such as are known in the art. Suitable such materials can appropriately include crosslinked hydrophilic polymers, such as polyacrylic acid and polyacrylic acid derivatives, and copolymers thereof, polymethacrylic acid and polymethacrylic acid derivatives, and copolymers thereof, polyethylene glycol and polyethylene glycol derivatives and copolymers thereof, polyacrylamide polymers and copolymers, NIPAM and NIPAM derivates. Currently preferred such materials for use in accordance with certain particular embodiments includes polyacrylic acid and polyacrylic acid derivatives, and copolymers thereof.

A first layer 40 of a selective semi-permeable material is disposed adjacent the super absorbent material first layer 34. The selective semi-permeable material first layer 40 is spaced apart from the electrically conductive metal support-layer 12 by the super absorbent material first layer 34.

A second layer 42 of a selective semi-permeable material is disposed adjacent the super absorbent material second layer 36. The selective semi-permeable material second layer 42 is spaced apart from the electrically conductive metal support layer 12 by the super absorbent material second layer 36.

Those skilled in the art and guided by the teaching herein provided will appreciate that various suitable semi-permeable materials are available and can be used in the practice of the invention dependent on factors such as the particular non-aqueous substance being sought to be separated from the aqueous medium. In accordance with particular embodiments, suitable semi-permeable materials may include membranes suitable for use in reverse osmosis, ultrafiltration and/or nanofiltration applications. It is also to be understood that in particular embodiments, the semi-permeable material may take the form of a filter medium such as suitable for use in the separation of macroscopic materials, such as biosolids, from a particular aqueous medium.

Moreover, while the above-described embodiment includes a super absorbent material and a semi-permeable layer disposed on each of the two opposed sides of an underlying support layer, those skilled in the art and guided by the teachings herein provided will appreciate that the broader practice of the invention is not necessarily so limited. For example, if desired, an embodiment wherein a layer of the super absorbent material and/or a layer of the semi-permeable material is/are disposed on only one of sides of an underlying support layer.

Figure 2:
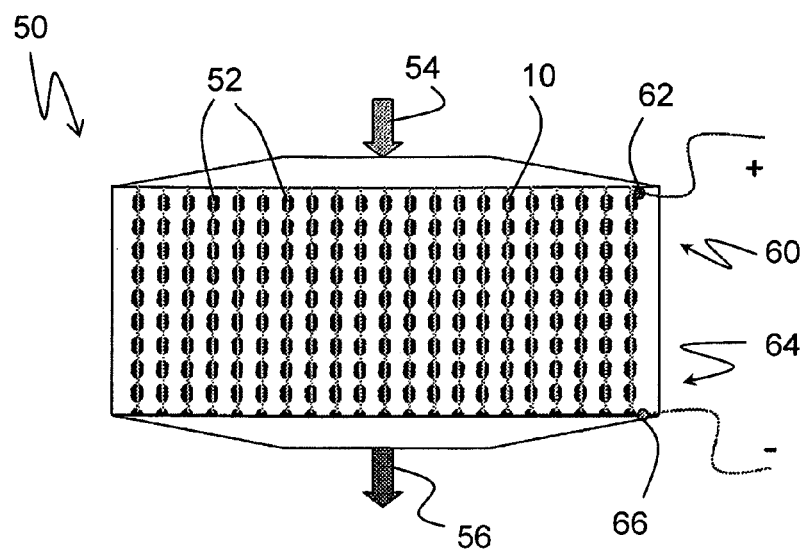
FIG. 2 is a simplified schematic of a colloid dewatering device using the SAP-including layered composite shown in FIG. 1.

FIG. 2 is a simplified schematic of a colloid dewatering device 50 using a plurality of the SAP-including layered composites 10 shown in FIG. 1.

The device 50 is fitted with a plurality of the layered composites 10 arranged in parallel in a plurality of columns 52. The arrow 54 represents a colloidal-containing aqueous medium being introduced into the device 50. The composites 10 serve to absorb or otherwise remove water from the colloidal-containing aqueous medium, i.e., dewater the colloidal-containing aqueous medium. The arrow 56 represents the colloidal concentrate resulting from such dewatering processing.

Those skilled in the art and guided by the teachings herein provided will appreciate that the arrangement of the layered composites 10 within the device 50 can desirably be optimized to maintain a reasonable pressure drop in the device even when the composites are in their swollen state.

Each of the layered composite columns 52 has a first end 60 joined to a positive electrode 62 and a second end 64 joined to negative electrode 66. Once the super absorbent material of the composites has desirably absorbed the aqueous medium, the composites can be appropriately regenerated via the application of electric current thereto to effect electrical deswelling.

While these illustrated embodiments, depict the support layer as having a planar form, it is understood that alternative forms can, if desired, be used. Thus, composites in accordance with the invention can be produced in flat and cylindrical configurations, for example.

Figure 3:
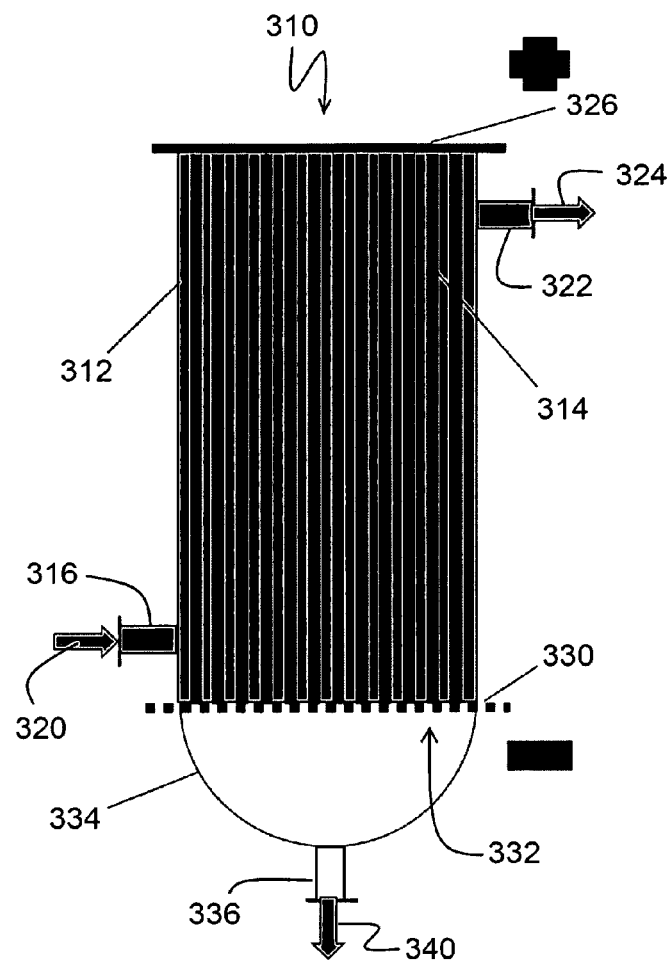
FIG. 3 is a schematic diagram of a desalination device in accordance with one aspect of the invention.

Turning to FIG. 3, there is shown a desalination device 310 in accordance with another aspect of the invention.

The desalination device 310 includes a shell or housing 312 containing a plurality of tubes 314 formed a semi-permeable material and filled with super absorbent polymer material such as in the nature of a hydrogel, as described above. The device 310 includes a saltwater inlet 316 whereby seawater, represented by the arrow 320, can be appropriately introduced into the device 310. The device 310 also includes an oppositely disposed saltwater concentrate or brine outlet 322 whereby saltwater concentrate or brine, represented by the arrow 324, can be appropriately removed from the device 310.

The device 310 further includes oppositely disposed positive and negative electrodes 326 and 330 respectively. The electrode 330 is fitted with drainage holes 332 to permit water absorbed or otherwise recovered from inlet seawater to be selectively released and recovered in a fresh water collector 334 such as appropriately disposed at the bottom portion of the device 310. An outlet 336 is disposed at the bottom of the device to permit fresh water, represented by the arrow 340 to be removed from the device 310.

Similar to the above-described embodiments and in this case with saltwater being the aqueous medium that contains the at least one non-aqueous substance, e.g., salt, that is being processed, the aqueous medium that contains the at least one non-aqueous substance is introduced into the shell 312 and circulates about and in contact with the tubes 314 of semi-permeable material and filled with super absorbent polymer material such that water is passed through the semi-permeable material and is absorbed or otherwise retained by the super absorbent polymer material while the salt remains on the shell side of the tubes 314. The water absorbed or otherwise retained by the super absorbent polymer material can be released, e.g., the water absorbed super absorbent polymer material is deswelled, via application of an appropriate electric current between the electrodes 326 and 330. The water released via such processing is recovered in the fresh water collector 334 and can be subsequently removed therefrom via the outlet 336.

In this and in other embodiments, the transport of fresh water through the membrane under the osmotic action of the super absorbent material can, if desired, be optionally assisted by raising the pressure on the saltwater side of the membrane.

If desired and in accordance with another aspect of the invention, hydrogen can be generated from salt water by hydrolyzing water recovered from the aqueous medium absorbed super absorbent material to form hydrogen and then collecting hydrogen formed by said hydrolyzing.

In practice, various specific methods to hydrolyze the water contained in the super absorbent material can be applied, including hydrolysis under the action of an electric field. If desired, the hydrolysis can be optionally assisted by adding a suitable electrolyte, such as known in the art.

Figure 4:
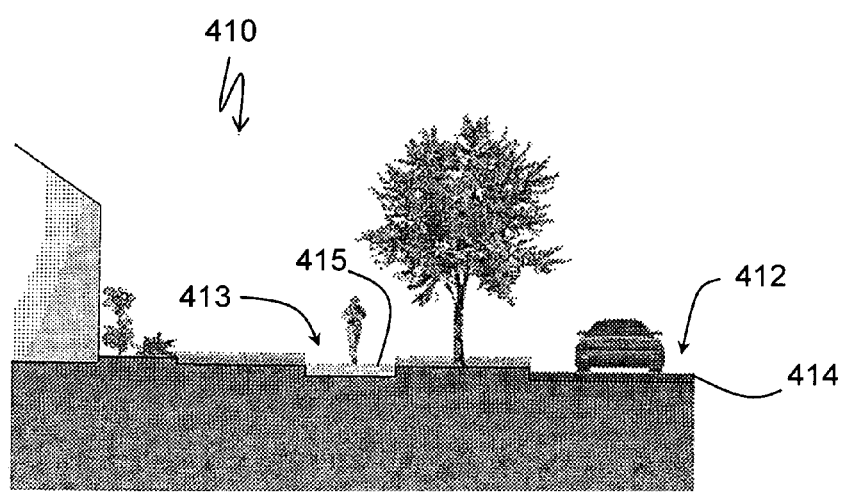
FIG. 4 is a schematic diagram of a storm water application in accordance with another aspect of the invention.
Figure 5:
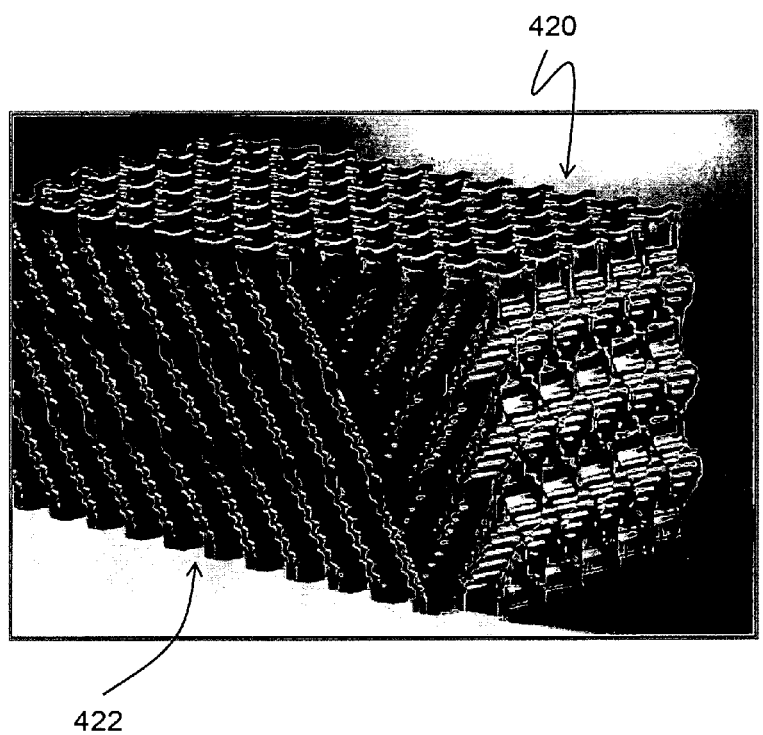
FIG. 5 is a simplified schematic of a storm water collection matrix element in accordance with another aspect of the invention.

Turning now to FIGS. 4 and 5, there is illustrated a storm water application in accordance with another aspect of the invention. More particularly, FIG. 4 depicts a suburban residential environment, generally designated by the reference numeral 410 and including a roadway 412 and a walkway 413. The roadway 412 and the walkway 413 each are illustrated as having one or more storm water collection devices 414 and 415, respectively, such as to form temporary holders of water, at least in part disposed below ground surface 416.

As will be appreciated by those skilled in the art and guided by the teachings herein provided, storm water collection devices in accordance with the invention can desirably be made or formed of one or more various suitable materials such as high strength polyethylene structural foam and polypropylene structured media, for example.

Turning to FIG. 5, there is shown a polypropylene structured media, designated by the reference numeral 420, such as for use in accordance with one embodiment of the invention. The structured media 420 may suitably form or include a plurality of grooves or openings 422 such as may hold, contain or otherwise have disposed therein a selected super absorbent polymer material such as in the nature of a hydrogel, as described above. By way of example and not necessarily limitation, the super absorbent polymer material may be placed in containers or holders such as in the form of pouches or the like such as formed of a semi-permeable material such as cloth or the like and such as appropriately disposed or positioned within selected of the structured media grooves or openings 422.

Storm water collection devices in accordance with the invention desirably also include appropriate connections to permit the appropriate desired deswelling of the aqueous medium absorbed super absorbent material. For example, the storm water collection devices desirably include or incorporate an electrically conductive material such as in the form of a wire mesh and such as joined or connected to a suitable electric power source to effect the appropriate desired deswelling of the aqueous medium absorbed super absorbent material upon application of electric current thereto.

While the invention has been described above making specific reference to embodiments that employ application of an electric current to effect release of water from the aqueous medium absorbed super absorbent material, those skilled in the art and guided by the teachings herein provide will appreciate that the broader practice of the invention is not necessarily so limited. For example, an alternate factor such as one or more of temperature, pH, and light can be used instead or in addition to the application of an electric current to effect or assist in the release water from the aqueous medium absorbed super absorbent material.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A method comprising:
    contacting a super absorbent polymer material with a first quantity of an aqueous medium to absorb at least a portion of the first quantity of the aqueous medium by the super absorbent material and
    regenerating at least portion of the aqueous medium absorbed super absorbent material via application of an electric current to the aqueous medium absorbed super absorbent material to release water therefrom and to form a regenerated super absorbent material suitable for the contacting with a second quantity of an aqueous medium,
    said method implemented with a device comprising:
    a layered composite comprising;
    an electrically conductive metal support layer to regenerate an aqueous medium absorbed super absorbent material in contact therewith upon application of electric current to the electrically conductive metal support layer,
    a first layer of the super absorbent material disposed on the electrically conductive metal support layer, and
    a first layer of the selective semi-permeable material disposed adjacent the first layer of the super absorbent material and spaced apart from the electrically conductive metal support layer thereby,
    wherein the electrically conductive metal support layer has opposed first and second surfaces with the first layer of the super absorbent material disposed on the first surface of the electrically conductive metal support layer, the layer composite additionally comprising:
    a second layer of the super absorbent material disposed on the second surface of the electrically conductive metal support layer and
    a second layer of the selective semi-permeable material disposed adjacent the second layer of the super absorbent material and spaced apart from the electrically conductive metal support layer thereby.

2. The method of claim 1 wherein the aqueous medium contains at least one non-aqueous substance, the method additionally comprising:
    passing the aqueous medium through a selective semi-permeable material to separate at least a portion of the at least one non-aqueous substance from the aqueous medium prior to the contacting of the super absorbent polymer material with the first quantity of the aqueous medium.

3. The method of claim 2 wherein the at least one non-aqueous substance comprises at least one material selected from the group consisting of biosolids, salts, impurities and other solutes.

4. The method of claim 2 wherein the semi-permeable material is permeable to water but impermeable to the at least one non-aqueous substance.

5. The method of claim 4 wherein the aqueous medium that contains at least one non-aqueous substance is on a first side of the selective semi-permeable material and the super absorbent polymer material is on an opposite second side of the selective semi-permeable material, the method additionally comprising raising pressure on the first side of the selective semi-permeable material to facilitate water transport through the selective semi-permeable material.

6. The method of claim 2 wherein the at least one non-aqueous substance is salt and separation of at least a portion of the at least one non-aqueous substance from the aqueous medium comprises desalination of water.

7. The method of claim 6 additionally comprising collecting fresh water from the super absorbent material.

8. The method of claim 1 wherein:
the super absorbent polymer material is disposed on a matrix material to form a temporary holder of water, the temporary holder of water also containing an electrically conductive metal element to regenerate the aqueous medium absorbed super absorbent material upon application of electric current thereto,
the temporary holder of water is at least in part disposed below ground surface, and
the aqueous medium comprises storm water.

9. The method of claim 8 wherein the temporary holder of water is at least in part disposed in a storm water collection line.

10. The method of claim 2 wherein the at least one non-aqueous substance comprises biosolids and said method produces dried biosolids.

\* \* \* \* \*